United States Patent
Capelluto et al.

(10) Patent No.: US 12,430,197 B2
(45) Date of Patent: Sep. 30, 2025

(54) ERROR MITIGATION IN A QUANTUM PROGRAM

(71) Applicant: International Business Machines Corporation, Armonk, NY (US)

(72) Inventors: Lauren Capelluto, New York, NY (US); Daniel Josef Egger, Zurich (CH); Naoki Kanazawa, Yokohama (JP); Manning Chuor, Lakeland, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1323 days.

(21) Appl. No.: 17/123,927

(22) Filed: Dec. 16, 2020

(65) Prior Publication Data

US 2022/0188182 A1    Jun. 16, 2022

(51) Int. Cl.
   *G06F 11/07*    (2006.01)
   *G06F 8/41*    (2018.01)
   *G06N 10/40*    (2022.01)
   *G06N 10/70*    (2022.01)

(52) U.S. Cl.
   CPC ............ *G06F 11/0793* (2013.01); *G06F 8/44* (2013.01); *G06F 11/0736* (2013.01); *G06F 11/076* (2013.01); *G06F 11/079* (2013.01); *G06N 10/40* (2022.01); *G06N 10/70* (2022.01)

(58) Field of Classification Search
   CPC .... G06N 10/70; G06N 10/40; G06F 11/0793; G06F 8/44; G06F 11/0736; G06F 11/076; G06F 11/079
   See application file for complete search history.

(56) References Cited

U.S. PATENT DOCUMENTS

| | | | |
|---|---|---|---|
| 6,635,898 B2 | 10/2003 | Williams et al. | |
| 8,219,871 B2 | 7/2012 | Roetteler | |
| 10,546,244 B2 | 1/2020 | Bishop et al. | |
| 10,572,814 B2 | 2/2020 | Friesen et al. | |
| 10,755,193 B2 | 8/2020 | Kandala et al. | |

(Continued)

FOREIGN PATENT DOCUMENTS

WO    WO-2021118464 A1 *   6/2021   ............... G06F 8/41

OTHER PUBLICATIONS

West et al., "Near-Optimal Dynamical Decoupling of a Qubit," Phys. Rev. Lett. 104, 130501—Published Apr. 1, 2010; 4 pages.

(Continued)

*Primary Examiner* — Markus A. Vasquez
(74) *Attorney, Agent, or Firm* — Amin, Turocy & Watson, LLP

(57) ABSTRACT

Embodiments are provided for error mitigation in quantum programs. In some embodiments, a system can include a processor that executes computer-executable components stored in memory. The computer-executable components can include a noise assessment component that identifies a noise condition of a qubit device based on a noise property of quantum hardware configured to operate on the qubit device. The qubit device is represented in a quantum program executable on the noisy quantum hardware. The computer-executable components also can include a compilation component that modifies the quantum program by inserting a defined sequence of error-mitigating operations into the quantum program based on the noise condition.

20 Claims, 16 Drawing Sheets

(56) References Cited

U.S. PATENT DOCUMENTS

| | | | |
|---|---|---|---|
| 2019/0026211 A1* | 1/2019 | Wallman | G06N 10/20 |
| 2019/0156236 A1* | 5/2019 | Bishop | H03K 3/013 |
| 2020/0072915 A1 | 3/2020 | Zhou et al. | |
| 2020/0184362 A1 | 6/2020 | Sukachev et al. | |
| 2021/0334081 A1* | 10/2021 | Chong | G06F 8/443 |
| 2021/0399743 A1* | 12/2021 | Zheng | G06N 10/70 |
| 2021/0399763 A1* | 12/2021 | Beck | G06N 10/40 |

OTHER PUBLICATIONS

Pokharel et al., "Demonstration of Fidelity Improvement Using Dynamical Decoupling with Superconducting Qubits," Phys. Rev. Lett. 121, 220502—Published Nov. 29, 2018, 6 pages.

Mell et al., "The NIST Definition of Cloud Computing," Recommendations of the National Institute of Standards and Technology, NIST Special Publication 800-145, Sep. 2011, 7 pages.

* cited by examiner

ERROR MITIGATION IN A QUANTUM PROGRAM

BACKGROUND

The subject disclosure relates to error mitigation in a quantum program, using dynamical decoupling (DD)—a control methodology for decreasing environment-qubit interaction by inserting non-computational sequence of operations into the quantum program.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later.

According to an embodiment, a system is provided. The system includes a processor that executes computer-executable components stored in memory. The computer-executable components include a noise assessment component that identifies a noise condition of a qubit device based on a noise property of quantum hardware configured to operate on the qubit device. The qubit device is represented in a quantum program executable on the noisy quantum hardware. The computer-executable components also include a compilation component that modifies the quantum program by inserting a defined sequence of error-mitigating operations into the quantum program based on the noise condition.

According to another embodiment, a computer-implemented method is provided. The computer-implemented method includes identifying, by a system operatively coupled to a processor, a noise condition of a qubit device based on a noise property of noisy quantum hardware configured to operate on the qubit device. The qubit device is represented in a quantum program executable on the noisy quantum hardware. The computer-implemented method also includes modifying, by the system, the quantum program by inserting a defined sequence of error-mitigating operations into the quantum program based on the noise condition.

According to a further embodiment, a computer program product for error mitigation in a quantum program. The computer program product includes a computer-readable storage medium having program instructions embodied therewith. The program instructions are executable by a processor to cause the processor to identify, by the processor, a noise condition of a qubit device based on a property of noisy quantum hardware configured to operate on the qubit device. The qubit device is represented in a quantum program executable on the noisy quantum hardware. The computer-executable instructions are further executable by the processor to cause the processor to modify, by the processor, the quantum program by inserting a defined sequence of error-mitigating operations into the quantum program based on the noise condition.

DETAILED DESCRIPTION

Figure 1A:
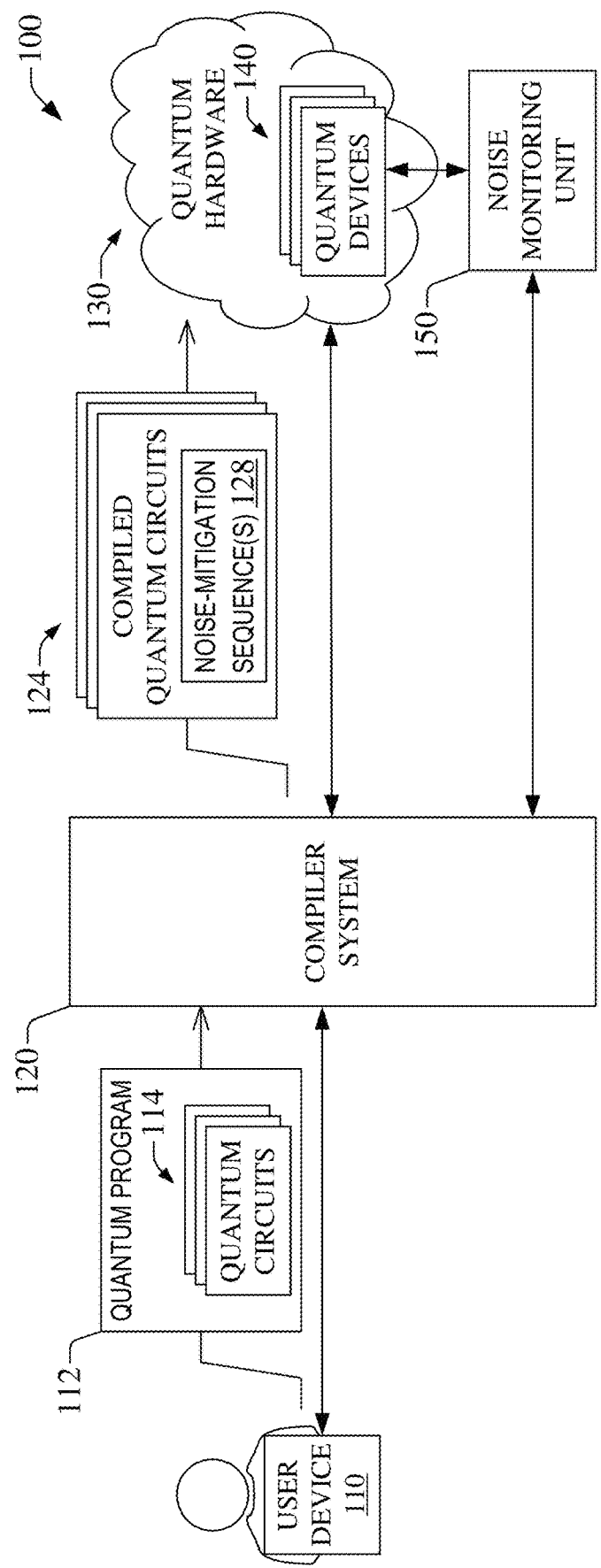
FIG. 1A illustrates a non-limiting example of an operational environment for error mitigation in a quantum program, in accordance with one or more embodiments described herein.

Embodiments of this disclosure address the issue of error mitigation in quantum computations. Qubit devices in a quantum computer are coupled to an environment that decoheres and relaxes the quantum information present in the quantum devices. Such a coupling is undesirable because it introduces noise in a quantum computation. Although such a coupling can be suppressed by judicious engineering, such a coupling may not be eliminated. An approach to error mitigation involves dynamical decoupling (DD). Such an approach, however, typically relies on knowledge of type of device noise present in the noisy quantum hardware prior to the configuration of a quantum program. Even when such knowledge is available, various types of DD sequences can be added to the quantum program, rendering the configuration of the quantum program including a DD sequence even more complex.

Embodiments of this disclosure provide error mitigation in quantum programs. Some embodiments separate the configuration of a quantum program from the insertion of sequences of error-mitigating operations. A sequence of error-mitigating operations can be inserted during compilation of the quantum program based on error conditions of quantum devices. The quantum devices can be embodied in multiple qubit devices or multiple qudit devices, or a combination of qubit devices and qudit devices, for example.

To that end, in some embodiments, the compiler system can receive data defining the quantum program from a user device. The quantum program can define one or several algorithms. In some cases, the quantum program can include one or several quantum circuits, where a quantum circuit can include multiple sequences of operations defining, at least partially, a quantum algorithm. In addition, or in other cases, the quantum program can include one or several program schedules, where a program schedule can include multiple sequences of operations defining, at least partially, a quantum algorithm. In addition, a program schedule can define both instants and waveforms, where a particular waveform defined in the program schedule can be applied at a particular instant defined in the schedule. Without intending to be bound by theory or modeling, a sequence refers to an ordered list of quantum operations that occur one after another, on a channel input to the noisy quantum hardware. Thus, the quantum program includes one or several sequences. A sequence represented as a program schedule can be configured to implement a circuit operation. Conversely, a circuit operation can have a program schedule definition in order to be operated on a quantum device.

The compiler system also can monitor noise conditions of quantum devices. To that point, the compiler system can receive data representative of noise affecting a quantum device, and can then apply a noise model to the data. As a result, the compiler system can identify a noise condition of the quantum device.

The compiler system can then determine if the noise condition satisfies an error-mitigation rule. An affirmative determination can cause the compiler system to modify the quantum program by inserting a defined sequence of error-mitigating operations into the quantum program. Such a sequence can be specific to the noise condition in order suppress a coupling between the quantum device and a noise source (environmental or otherwise). In some cases, the defined sequence of error-mitigating operations can include one or many iterations of an XY sequence (e.g., XY4 or XY8 sequence); one or many iterations of a Can-Purcell (CP) sequence; one or many iterations of a Carr-Purcell-Meiboom-Gill (CPMG) sequence; one or many iterations of a Uhrig dynamical decoupling (UDD) sequence; one or more iterations of a concatenated dynamical decoupling (CDD) sequence; Knill dynamical decoupling (KDD) sequence. In addition, or in other cases, the defined sequence of error-mitigating operations can include a multi-qubit sequence, such as one or more iterations of a nested UDD (NUDD) sequence or one or more iterations of a nested CDD (NCDD) sequence. It is noted that that a particular discrete operation within the defined sequence of error-mitigating operations (e.g., the X gate) can be translated to one of many schedule representations.

The compiler system can continue monitoring noise conditions of the quantum devices in order to re-compile the quantum program multiple times in response to changes in the noise conditions. In other words, the compiler system can dynamically compile the quantum program in response to changes in noise conditions of one or several of the quantum devices. In such a fashion, without intervention from a user device, the compiler system can generate a compiled version of the quantum program that is adapted to noise conditions in noisy quantum hardware.

Because the compiler system can identify noise conditions of quantum devices, information on noise affecting the quantum devices need not be available to a user device that configures the quantum program. That is, the user device need not have access to a noise model in order for the quantum program to be adapted to the identified noise conditions by inserting a sequence of error-mitigating operations into the quantum program. Accordingly, as mentioned, embodiments of the disclosure can separate the configuration of a quantum program at a user device from the insertion of sequences of error-mitigating operations into the quantum program. Therefore, embodiments of the disclosure provide several advantages relative to commonplace approaches to error mitigation, such as typical dynamical decoupling, hardware improvement, or pulse shape optimization. As an example, embodiments of this disclosure can permit executing quantum circuits and schedules including lengthier sequences of operations on noisy quantum hardware, without prior knowledge of dynamical decoupling and/or device noise in the noisy quantum hardware. As another example, by inserting noise-mitigation sequences that can be specific to noise conditions of a quantum device (e.g., a qubit device or a qudit device), embodiments of this disclosure can reduce resource overhead and/or noise thresholds required to perform fault-tolerant quantum computing.

Some embodiments of this disclosure are described with reference to qubit devices and quantum circuits simply for the sake of illustration. The disclosure, however, is not limited in that respect. The principles of this disclosure also can be applied to program schedules and/or qudit devices and other types of quantum devices. Indeed, the principles of this disclosure can be applied to any representation of quantum operations and any type of quantum devices utilized in a physical implementation of a quantum computer.

Figure 1B:
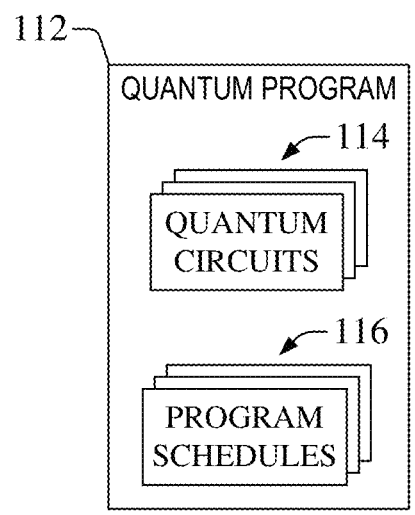
FIG. 1B illustrates a non-limiting example of a quantum program in accordance with one or more embodiments described herein.

With reference to the drawings, FIG. 1A illustrates a non-limiting example of an operational environment 100 for error mitigation in a quantum program, in accordance with one or more embodiments described herein. The operational environment 100 includes a user device 110 operatively coupled to a compiler system 120. The user device 110 can send data defining a quantum program 112 to a compiler system 120 for compilation. The quantum program 112 can define one or several quantum algorithms. Thus, the quantum program 112 can include a group of quantum circuits 114 that represents at least a portion of the quantum program 112. The group of quantum circuits 114 includes one or multiple quantum circuits. In some cases, the group of quantum circuits 114 includes particular quantum circuits representing a quantum algorithm (such as a variational quantum algorithm) included in the quantum program 112. In addition, or in other cases, as is shown in FIG. 1B, the quantum program 112 can include one or several program schedules 116. As mentioned, each one of the program schedule(s) 116 can include multiple sequences of operations defining, at least partially, the quantum algorithm.

Each quantum circuit in the group of quantum circuits 114 can include one or several of various quantum gates. Those quantum gates can include, for example, a Pauli gate (X gate or Y gate, for example); a Hadamard gate; a rotation gate ($R_z$ gate and phase shift gate, for example); a controlled-phase shift gate; a controlled-NOT ($C_X$) gate; a Toffoli (or controlled-controlled-NOT) gate; a swap gate; a Fredkin gate; among many other gates. The data defining the quantum program 112 can include, in some embodiments, first data defining one or several first quantum gates that constitute a first quantum circuit of the group of quantum circuits 114. Such data also can include second data defining one or several second quantum gates that constitute a second quantum circuit of the group of quantum circuits 114. In addition, or in some embodiments, rather than defining particular quantum gates, the data defining the program 112 can include first data defining one or several first general unitary matrices constituting at least one the group of quantum circuits 114.

Figure 2:
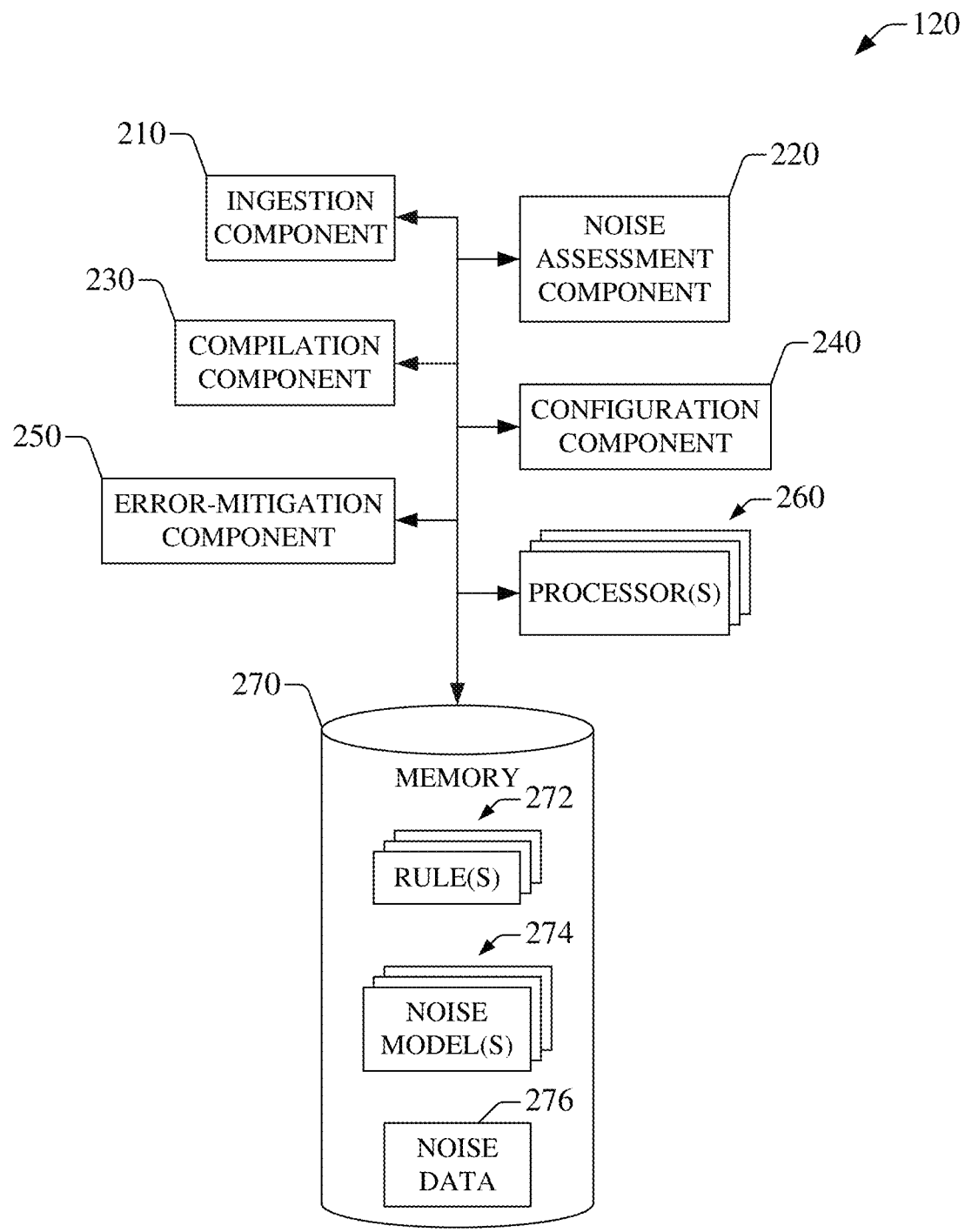
FIG. 2 illustrates a non-limiting example of a computing system for error mitigation in a quantum program, in accordance with one or more embodiments described herein.

The compiler system 120 can receive the data defining the quantum program 112. In some embodiments, as is illustrated in FIG. 2, the compiler system 120 can include an ingestion component 210 that can receive the data defining the quantum program 112. As is also illustrated in FIG. 2, the compiler system 120 also can include other components, one or several processors 260, and one or several memory devices 270 (referred to as memory 270). The components, the processor(s) 260, and the memory 270 can be electrically, optically and/or communicatively coupled to one another.

Back to referring to FIG. 1A, the compiler system 120 can then compile the quantum program 112 for execution on quantum hardware 130. In some embodiments, the quantum hardware 130 embodies, or includes, a cloud-based quantum computer. In other embodiments, the quantum hardware 130 embodies, or includes, a local quantum computer. Regardless of its spatial footprint, the quantum hardware 130 can include multiple quantum devices 140. The quantum devices 140 can include one type of devices, such as qubit devices or qudit devices, in some cases. Qubit devices can be solid-state devices of one of several types. For example, the qubit devices can be Josephson junction devices, semiconductor quantum-dots, or defects in a semiconductor material (such as vacancies in Si and Ge). In other embodiments, the qubit devices can include atomic qubits assembled in an ion-trap. For instance, the atomic qubits can be embodied in a calcium ion, an ytterbium ion, or similar ions.

In other cases, the quantum devices 140 can combine two or more types of devices, such as qubit devices and qudit devices. Each quantum device of the quantum devices 140 is coupled to an environment that decoheres and relaxes quantum information contained in the quantum device. Thus, the quantum hardware 130 can be noisy.

The compiler system 120 can compile the quantum program 112 based on noise conditions of the quantum devices 140, as data on the noise conditions become available. Rather than compiling the quantum program 112 a single time in order to implement a quantum algorithm, the compiler system 120 can compile the quantum program 112 multiple times in response to changes in the noise conditions during the implementation of the quantum algorithm. Further, in each compilation, the compiler system 120 can insert a defined sequence of error-mitigating operations into the quantum program 112. That is, the compiler system 120 can dynamically compile the quantum program 112 in response to changes in respective noise conditions of one or several of the quantum devices 140, modifying the quantum program 112 by inserting the sequence of noise-mitigating operations into the quantum program 112. That sequence can be customized to a contemporaneous noise condition of a quantum device of the quantum devices 140. Such a modification can be implemented in addition to other types of transpilation performed during compilation of the quantum program 112, for example.

To that end, the compiler system 120 can continually receive data indicating one or more contemporaneous characteristics of noise affecting respective quantum devices of the quantum devices 140. Thus, the compiler system 120 can receive data indicating a contemporaneous characteristic of noise affecting a quantum device (e.g., a qubit or a qudit) of the quantum devices 140. In some cases, the compiler system 120 can receive data indicating respective contemporaneous characteristics of noise affecting a subset of the quantum devices 140. In other cases, the compiler system 120 can receive data indicating a contemporaneous characteristic of noise affecting each one of the quantum devices 140. In other cases, rather than receiving that data continually, the compiler system 120 can receive the data periodically, at a defined rate. Accordingly, the compiler system 120 can determine noise conditions affecting a quantum device, each of the noise conditions representing a temporal snapshot of noise affecting the quantum device.

In addition, a noise monitoring unit 150 can continually probe at least one quantum device of the quantum devices 140. As data indicating a noise characteristic of a quantum device of the quantum devices 140 becomes available, the noise monitoring unit 150 can send the data to the compiler system 120. In some embodiments, as is illustrated in FIG. 2, the compiler system 120 can include a noise assessment component 220 that can continually receive, from the noise monitoring unit 150, data indicating a contemporaneous characteristic of noise affecting the quantum device. Again, in some cases, the quantum device can be embodied in a qubit device or a qudit device. The noise assessment component 220 can retain such data in the memory 270. The data can be retained in one or several records 276 (referred to as noise data 276).

Using the received data indicating a noise characteristic of a quantum device, the compiler system 120 can identify a noise condition of the quantum device based on a physical property of the quantum hardware 130. To that end, in some embodiments, the compiler system 120 can include one or several noise models 274 retained in the memory 270. Each one of the noise model(s) 274 can be described by a set of parameters defining one or several types of coupling of a quantum device to an environment. Regardless of its particular type, the coupling between the quantum device and the environment causes energy relaxation or decoherence of the quantum device, or both. Further, each one of the noise model(s) 274 can be based on the physical property of the quantum hardware 130. For example, in some embodiments, one type of coupling can be electron-phonon coupling. The noise assessment component 220 can identify the noise condition of the quantum device by applying at least one of the noise model(s) 274 to the data.

Further, the compiler system 120 can determine that the noise condition satisfies an error-mitigation rule defined according to at least one of heuristics or an analytic formalism. One or many definitions of error-mitigation rules can be retained in one or multiple memory elements 272 (referred to as retention rule(s) 272) within the memory 270. For purposes of illustration, an error-mitigation rule can dictate, for example, that a sequence of error-mitigating operations acting on a quantum device is to be inserted into the quantum program 112 when the quantum device is not in the ground state at the start of the quantum program 112. Another error-mitigation rule can dictate, for example, that in the presence of noise having a particular amplitude or frequency, an idling period of a quantum device fits a candidate sequence of error-mitigating operations. For instance, while the error-mitigation rule may not be satisfied for an XY4 sequence because the idling period is less than duration of the XY4 sequence, the idling period can fit a CMPG sequence. In some cases, such a rule can be defined for any type of noise condition, without restriction to particular noise amplitude and/or frequency.

Yet another error-mitigation rule can dictate, for example, that in the presence of noise having a particular amplitude or frequency, a sequence of error-mitigating operations is to be inserted into the quantum program 112 when dephasing errors in a quantum device are greater than expected errors accumulated by the application the sequence. For instance, for the noise condition, an XY4 sequence is to be inserted when the expected errors accumulated by the application of the XY4 sequence are less than the dephasing errors. The noise assessment component 220 (FIG. 2) can determine the expected accumulated errors using single-qubit gate error rates, for example. Still another error-mitigation rule can dictate, for example, that in the presence of noise having a particular amplitude or frequency, a sequence of error-mitigating operations is to be inserted when single-qubit error rates for an idling quantum device are less than a threshold rate. For instance, according to such a rule, an XY4 sequence may be inserted into the quantum program 112 without increasing overall program duration. Again, in some cases, such rules can be defined for any type of noise condition, without restriction to particular noise amplitude and/or frequency. The compiler system 120 can obtain gate error data and/or dephasing time data from an error monitoring unit (not depicted in FIG. 1A) included in the compiler system 120 or operatively coupled thereto.

In response to the noise condition satisfying the error-mitigation rule, the compiler system 120 can insert the defined sequence of error-mitigating operations into the quantum program 112. The defined sequence of error-mitigating operations can include, for example, a sequence of particular operations that do not alter computation. That is, the ordered implementation of the sequence of particular operations during execution of the quantum program 112 results in the implementation of the identity operation. In other words, without intending to be bound by theory and/or modeling, the implementation of the sequence of non-computational operations can offset the effects of noise on the qubit, thus mitigating the accumulation of errors during the execution of the compiled quantum circuit.

Accordingly, the compiler system 120 can generate compiled quantum circuits 124 that include one or more noise-mitigation sequences 128. A first noise-mitigation sequence of the noise-mitigation sequence(s) 128 can include the defined sequence of error-mitigating operations. The first noise-mitigation sequence can be inserted into a first compiled quantum circuit of the compiled quantum circuits 124. In addition, or as an alternative, a second noise-mitigation sequence of the noise-mitigation sequence(s) 128 can include a second defined sequence of error-mitigating operations. The second noise-mitigation sequence can be inserted into a second compiled quantum circuit of the compiled quantum circuits 124. A number and placement of the noise-mitigation sequence(s) 128 can be determined, for example, by a number of quantum devices in the quantum devices 140 being affected by respective noise conditions satisfying the error-mitigation rule.

The defined sequence of error-mitigating operations can be customized to the noise condition that satisfies the error-mitigation rule. Such a customization can permit suppressing undesired coupling between a quantum device and a noise source. One or multiple aspects of that sequence can be customized to the noise condition. As an illustration, modulation frequency for the operations, type of sequence, number of repetitions of a particular sequence, and/or delay between operations within a sequence can be customized.

To that point, in some embodiments, the compiler system 120 can determine a DD sequence of pulses based on a noise property (e.g., amplitude of noise or frequency dependence of noise) or a configuration of the quantum program 112, or both. In some embodiments, as is shown in FIG. 2, the compilation component 230 can be operatively coupled to a configuration component 240 that can determine the DD sequence of pulses that define error-mitigating operations. As such, in some cases, the configuration component 240 can generate a schedule defining instants in which each one of the pulses begins and ends, for example. The schedule also can include amplitudes of respective pulses within the DD sequence of pulses. The compilation component 230 can then insert a representation of the DD sequence of pulses into at least one of a program schedule included in the quantum program 112 (see FIG. 1B) or a quantum circuit included in the quantum program 112. In other cases, the configuration component 240 can define error-mitigating operations in terms of set of gates representing the DD sequence of pulses. The configuration component 240 can then insert the set of gates into the quantum circuit or the program schedule. It is noted that in some embodiments, the configuration component 240 can be integrated into the compilation component 230.

In some embodiments, the configuration component 240 (FIG. 2) can generate a sequence of error-mitigating operations customized according to an arrangement of operations defined in a quantum circuit of the quantum program. As such, in some implementations, the configuration component can customize the DD sequence of pulses to the quantum circuit or a program schedule. More specifically, the configuration component 240 can generate a sequence of error-mitigating operations based on one or many idling periods of the quantum circuit. An idling period represents a time interval during which a qubit (or another type quantum device) can evolved freely within its environment.

Figure 3:
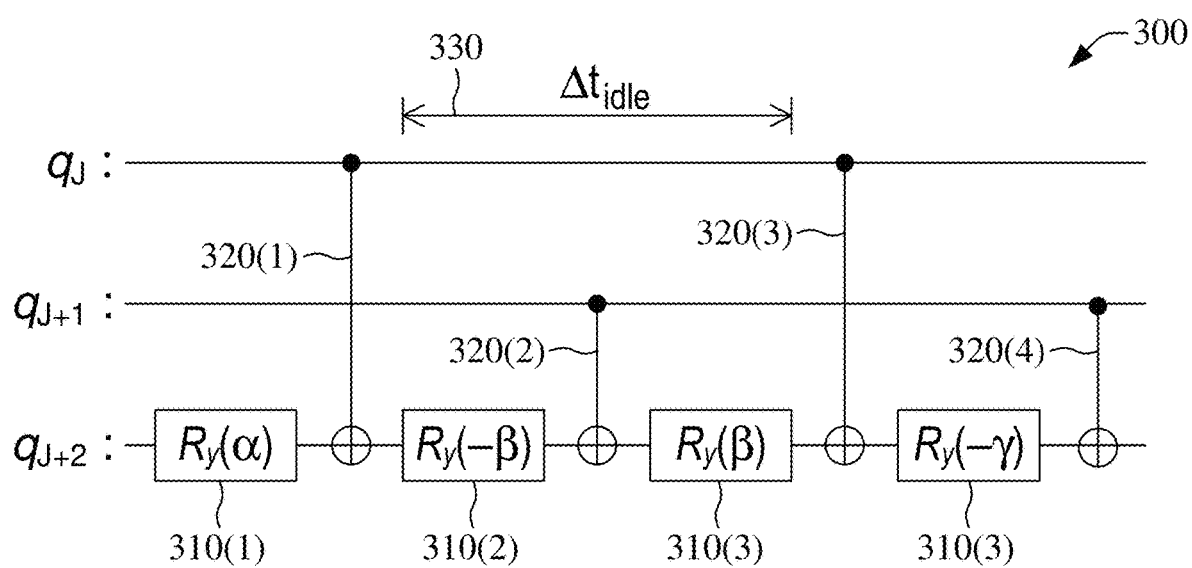
FIG. 3 illustrates a non-limiting example of a portion of a quantum circuit, in accordance with one or more embodiments of this disclosure.

Simply as an illustration, FIG. 3 present a non-limiting example of a portion of a quantum circuit 300 that can be included in the quantum program 112 (see FIG. 1A or FIG. 1B), in accordance with one or more embodiments of this disclosure. The quantum circuit 300 includes a three-qubit register including a first qubit $q_J$, a second qubit $q_{J+1}$, and a third qubit $q_{J+2}$, with J a natural number equal to or greater than unity. In some embodiments, those qubits can be part of larger register including N qubits: $q_1, q_2, \ldots, q_{J-1}, q_J, q_{J+1}, q_{J+2}, \ldots q_N$, with 2<J and J+2<N. The quantum circuit 300 includes eight gates: a first rotation gate $R_y$ 310(1) corresponding to a rotation of an angle $\alpha$ about a $\hat{y}$ axis in the Bloch sphere of $q_J$, $q_{J+1}$, and $q_{J+2}$; a first $C_X$ gate 320(1); a second rotation gate $R_y$ 310(2) corresponding to a rotation of an angle $-\beta$ about the $\hat{y}$ axis in the Bloch sphere; a second $C_X$ gate 320(2); a third rotation gate $R_y$ 310(3) corresponding to a rotation of an angle $\beta$ about the $\hat{y}$ axis in the Bloch sphere; a third $C_X$ gate 320(3); a fourth rotation gate $R_y$ 310(4) corresponding to a rotation of an angle $-\gamma$ about the $\hat{y}$ axis in the Bloch sphere; and a fourth $C_X$ gate 320(4).

In the quantum circuit 300, the qubit $q_J$ undergoes an idling period 330 (denoted $\Delta t_{idle}$ in FIG. 3). The minimum magnitude of $\Delta t_{idle}$ can be determined by the duration of a second rotation gate $R_y$ 310(2), the second $C_X$ gate 310(2); and the third rotation gate $R_y$ 310(3). Thus, the idling period 330 can be specific to the configuration of the quantum circuit 300. The compiler system 120 can identify the idling period 330. Such a configuration can include, for example, a particular arrangement of operations for a group of qubits represented by the quantum circuit. In addition, or as another example, the configuration can include a particular arrangement of idling periods within the quantum circuit 300. In some embodiments, the configuration component 240 (FIG. 2) identifies that idling period.

The compiler system 120 can then determine, using the magnitude of the idling period 330 and the noise condition that satisfies the error-mitigation rule, a DD sequence of pulses to be inserted into the quantum circuit 300. In some embodiments, the DD sequence of pulses can be determined in such a fashion by the compilation component 230 (FIG. 2). A total duration of the DD sequence of pulses can be similar to the idling period 330. The total duration can be longer than the idling period 330 in situations in which the total duration permits the compilation component 230 to insert the DD sequence of pulses in its entirety within the time interval between the application of the first $C_X$ gate 320(1) and the third $C_X$ gate 320(3). As an illustration, the DD sequence of pulses can be embodied in three XY4 sequences lasting 300 ns. In some cases, an XY4 sequence is symmetric and can include an ordered sequence of operations containing a delay τ, an X gate, a delay τ', a Y gate, the delay τ', a second X gate, the delay τ', a second Y gate, and the delay τ. In other cases, the XY4 sequence is asymmetric and can include an ordered sequence of operations containing a delay τ, an X gate, a second delay τ', a Y gate, the delay τ', a second X gate, the delay τ', and a second Y gate. When the identified idling period 330 is 290 ns, for example, the compilation component 230 can insert three XY4 sequences instead of two XY4 sequences in an attempt to attain greater error mitigation.

Further, or in other embodiments, the configuration component 240 can generate a sequence of error-mitigating operations customized according to a duration of the sequence and output fidelity that can be expected in response to the insertion of the sequence into the quantum program 112. Thus, the configuration component 240 can determine a sequence of error-mitigating operations that has a particular duration and provides a satisfactory output fidelity.

The compiler system 120 can apply a particular sequence of error-mitigating operations as part of the execution of the compiled quantum circuits 124. The application of such a sequence can leverage the noise monitoring unit 150 to provide pertinent data or control instructions, or both. In some embodiments, as is illustrated in FIG. 2, the compiler system 120 can include an error-mitigation component 250 that can apply a DD sequence of pulses to the one or more qubit devices of the quantum devices 140 via one or more DD gates. In other configurations, rather than relying on gates, the error-mitigation component 250 can apply a DD sequence of pulses as a waveform applied to the one or more qubit devices. The waveform can be embodied, for example, in output voltage of an arbitrary waveform generator (AWG). The electrical signal generated by the AWG can induce a unitary evolution of a qubit device, for example, due to dipole coupling. Accordingly, the application of the waveform can suppress undesired coupling between the qubit device(s) and a noise source.

Figure 1C:
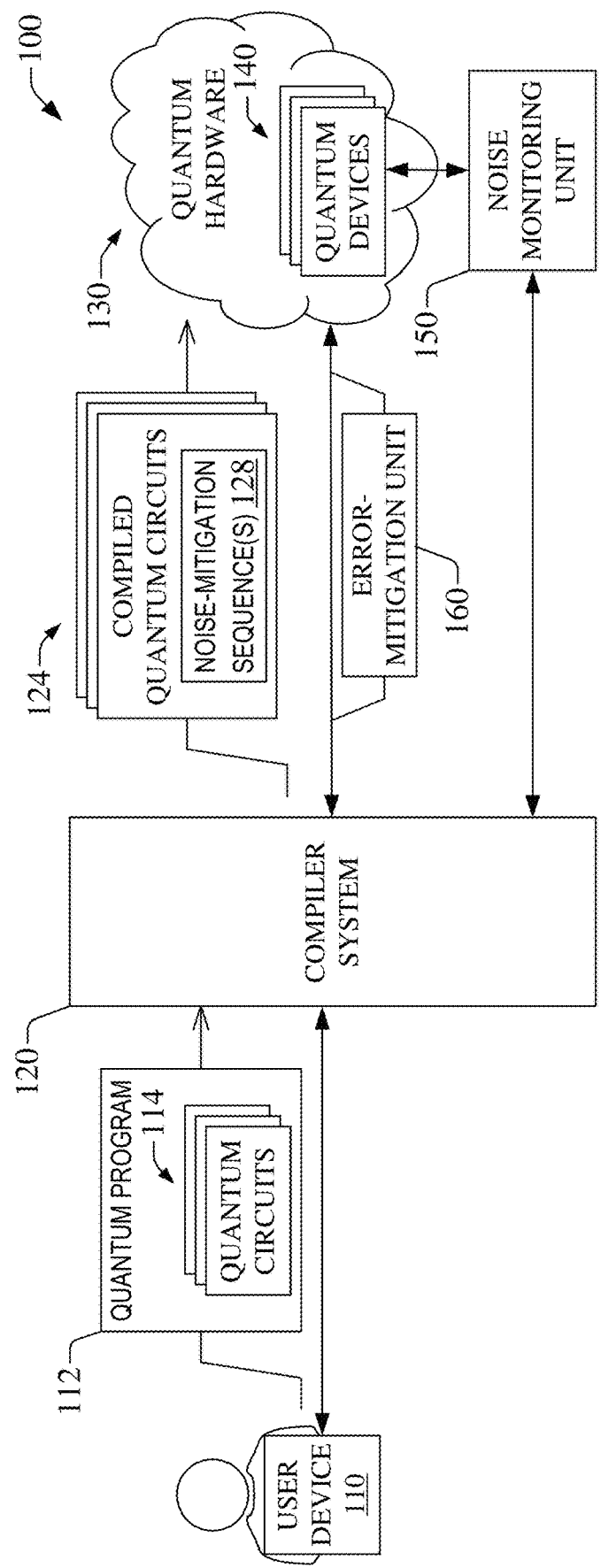
FIG. 1C illustrates a non-limiting example of another operational environment for error mitigation in a quantum program, in accordance with one or more embodiments described herein.

Other configurations for the application of the particular sequence of error-mitigating operations are contemplated. In some configurations, rather than relying on the error-mitigation component 250, the compiler system 120 can be operatively coupled to an error-mitigation unit 160, as is illustrated in FIG. 1C. The compiler system 120 can direct the error-mitigation unit 160 to apply a particular sequence of error-mitigating operations as part of the execution of the compiled quantum circuits 124. In some embodiments, the configuration component 240 (FIG. 2) can cause the error-mitigation unit 160 to apply a DD sequence of pulses to the one or more qubit devices of the quantum devices 140 via one or more DD gates. In other embodiments, rather than relying on gates, the configuration component 240 (FIG. 2) can cause the error-mitigation unit 160 to apply a DD sequence of pulses as a waveform applied to the one or more qubit devices.

In some embodiments, the compiler system 120 need not generate a particular sequence of error-mitigating operations. Instead, the compiler system 120 can modify a user-defined sequence of error-mitigating operations, and can then insert the modified sequence of error-mitigating operations into the quantum program 112.

Figure 4:
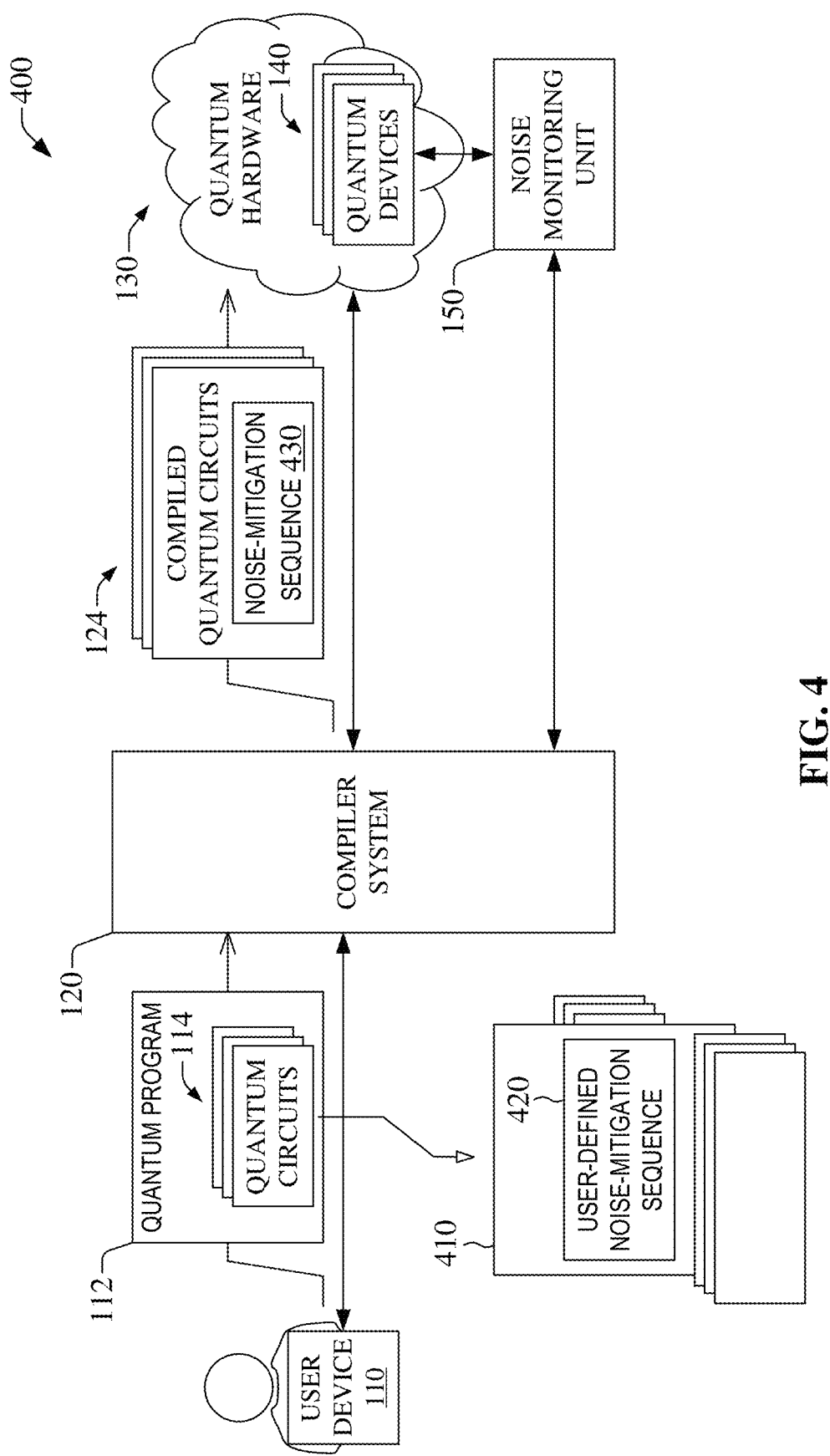
FIG. 4 illustrates a non-limiting example of another operational environment for error mitigation in a quantum program, in accordance with one or more embodiments described herein.

As is illustrated in FIG. 4, the group of quantum circuits 114 can include a quantum circuit 410 that includes a user-defined noise-mitigation sequence 420. As discussed herein, the compiler system 120 can determine that a noise condition of a quantum device (e.g., a qubit device or a qudit device) can satisfy an error-mitigation rule. The quantum circuit 410 includes an element representing such a quantum device. As mentioned, the error-mitigation rule can be defined according to at least one of heuristics or an analytic formalism. In response, the compiler system 120 can modify the user-defined noise-mitigation sequence 420, resulting in a noise-mitigation sequence 430. In one aspect of such a modification, the compiler system 120 can match the user-defined noise mitigation 420 to a particular sequence of error-mitigating operations based on the noise condition and an arrangement of operations in the quantum circuit 420. That particular sequence constitutes the noise-mitigation sequence 430. In one embodiment, the configuration component 240 (FIG. 2) can match the user-defined noise-mitigation sequence 420 to the particular sequence of noise-mitigating operations.

The compiler system 120 can then apply the noise mitigation sequence 430 to the quantum circuit 410. To that end, the compiler system 120 can insert at least a portion of the noise mitigation sequence 430 into an idling period of the quantum circuit 410. Further, the noise mitigation sequence 430 can include a group of operations that is repeated multiple times—e.g., an XY4 sequence that is repeated three times. The compiler system 120 can apply such a noise mitigation sequence 430 to an idling period that can fit at least one repetition of that group of operations. In one embodiment, the compilation component 240 (FIG. 2) can apply the noise mitigation sequence 430 as is described herein.

Figure 5A:
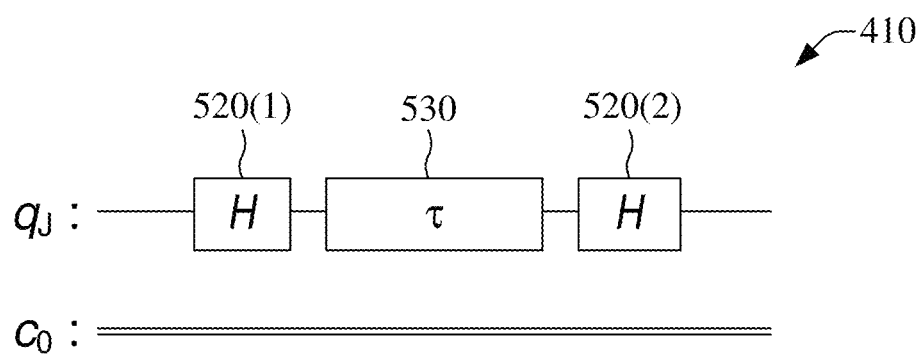
FIG. 5A illustrates a non-limiting example of a quantum circuit, in accordance with one or more embodiments of this disclosure.

Simply for purposes of illustration, as is shown in FIG. 5A, the quantum circuit 410 can include the qubit $q_J$ and a classical bit $c_0$. In such a non-limiting example of the quantum circuit 410, a first Hadamard gate 510(1) operates on $q_J$, followed by a delay 530 (denoted as τ in FIG. 5A). After the delay 530, a second Hadamard gate 510(2) operates on $q_J$. The delay 530 represents free evolution of the state of $q_J$ for a duration τ. In one case, the magnitude of the delay 530 can be equal to 1700 computation timesteps (e.g., τ=1700 in units of dt, where dt is the duration of a timestep). As mentioned, in one example, the noise mitigation sequence 430 can include an XY4 sequence that is repeated three times.

The configuration component 240 (FIG. 2) can identify the delay 530 as 1700 dt and the compilation component 240

Figure 5B:
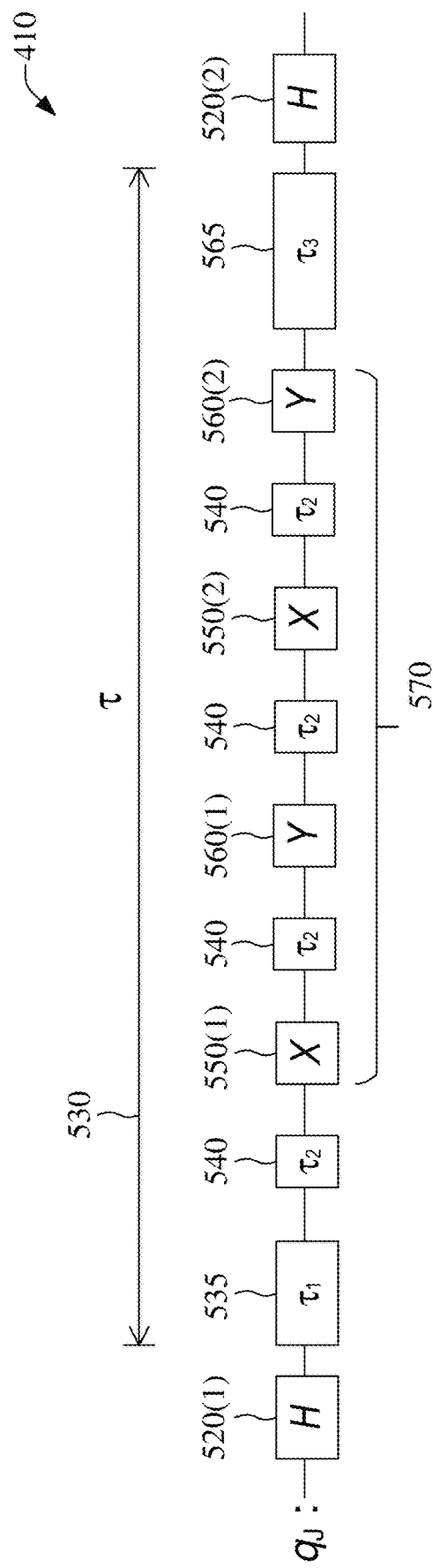
FIG. 5B illustrates a non-limiting example of another quantum circuit, in accordance with one or more embodiments of this disclosure.

(FIG. 2) can select a single XY4 sequence from the example noise mitigation sequence 430. The single XY4 sequence illustrated in FIG. 5B is asymmetric and includes an ordered sequence of operations containing a delay 540 (denoted as $\tau_2$), an X gate 550(1), the delay 540, a first Y gate 560(1), the delay 540, a second X gate 550(2), the delay 540, and a second Y gate 560(2). In one example, the delay 540 is 45 dt. The compilation component 240 (FIG. 2) can center the single XY4 sequence such that if there is a remaining portion of the delay 530 (an idling period), the compilation component 240 can split that remaining portion into two delay periods: a first delay 535 (denoted as $\tau_1$) and a second delay 565 (denoted as $\tau_3$). To that end, the compilation component 240 can assign a part of the remaining portion of the delay 530 to the first delay 535, which occurs before the start of the single XY4 sequence. In addition, the compilation component 240 can assign another part of the remaining portion of the delay 530 to the second delay 565, which occurs after the duration of the single XY4 sequence. The duration of the single XY4 sequence can span 1460 dt. Thus, for a delay 530 of 1700 timesteps, the compilation component 240 can split the remaining 240 timesteps left in order to center the XY4 operations 570 included in the single XY4 sequence. As is depicted in FIG. 2, $\tau_1$ can be equal to 97 dt and $\tau_3$ can be equal to 143 dt.

The compiler system 120 can then generate a compiled quantum circuit 410. The compiler system 120 can then send the compiled quantum circuit 410 for execution by the quantum hardware 130.

Figure 6:
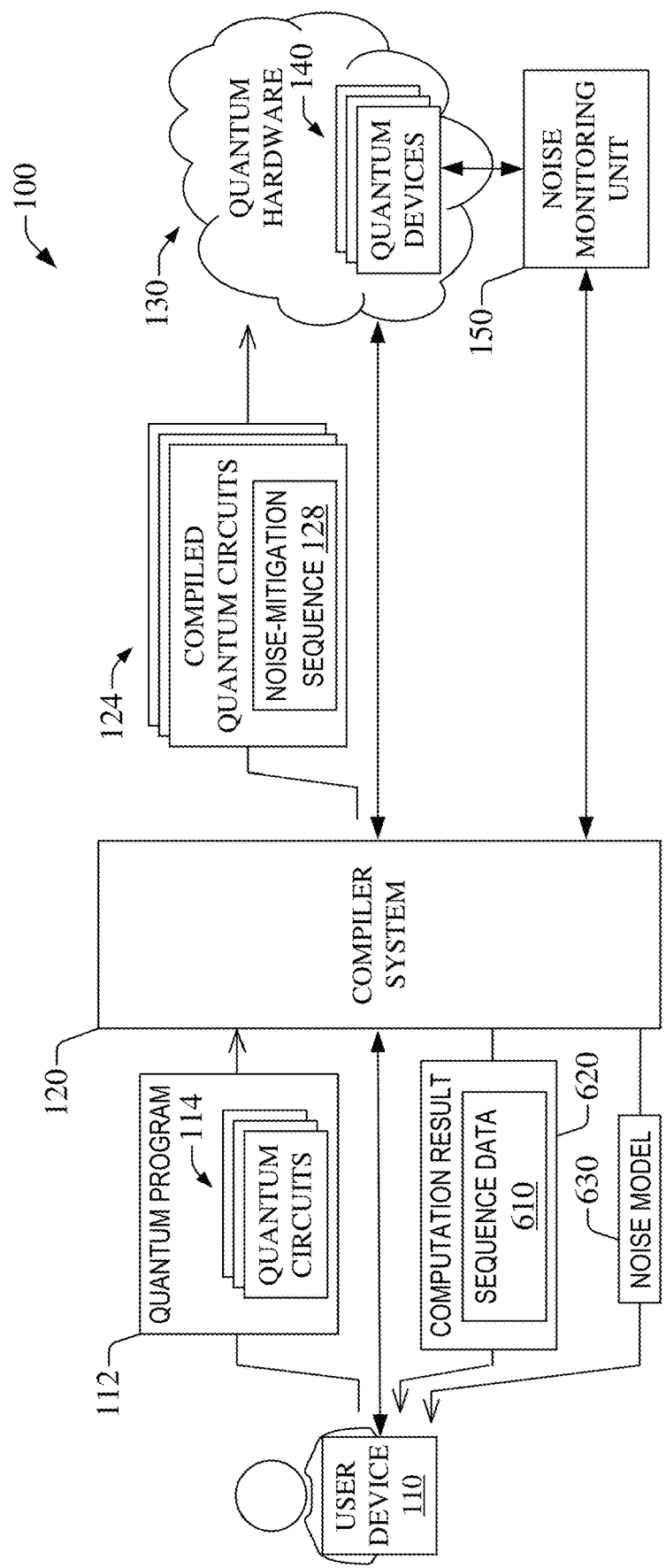
FIG. 6 illustrates a non-limiting example of another operational environment for error mitigation in a quantum program, in accordance with one or more embodiments described herein.
Figure 7:
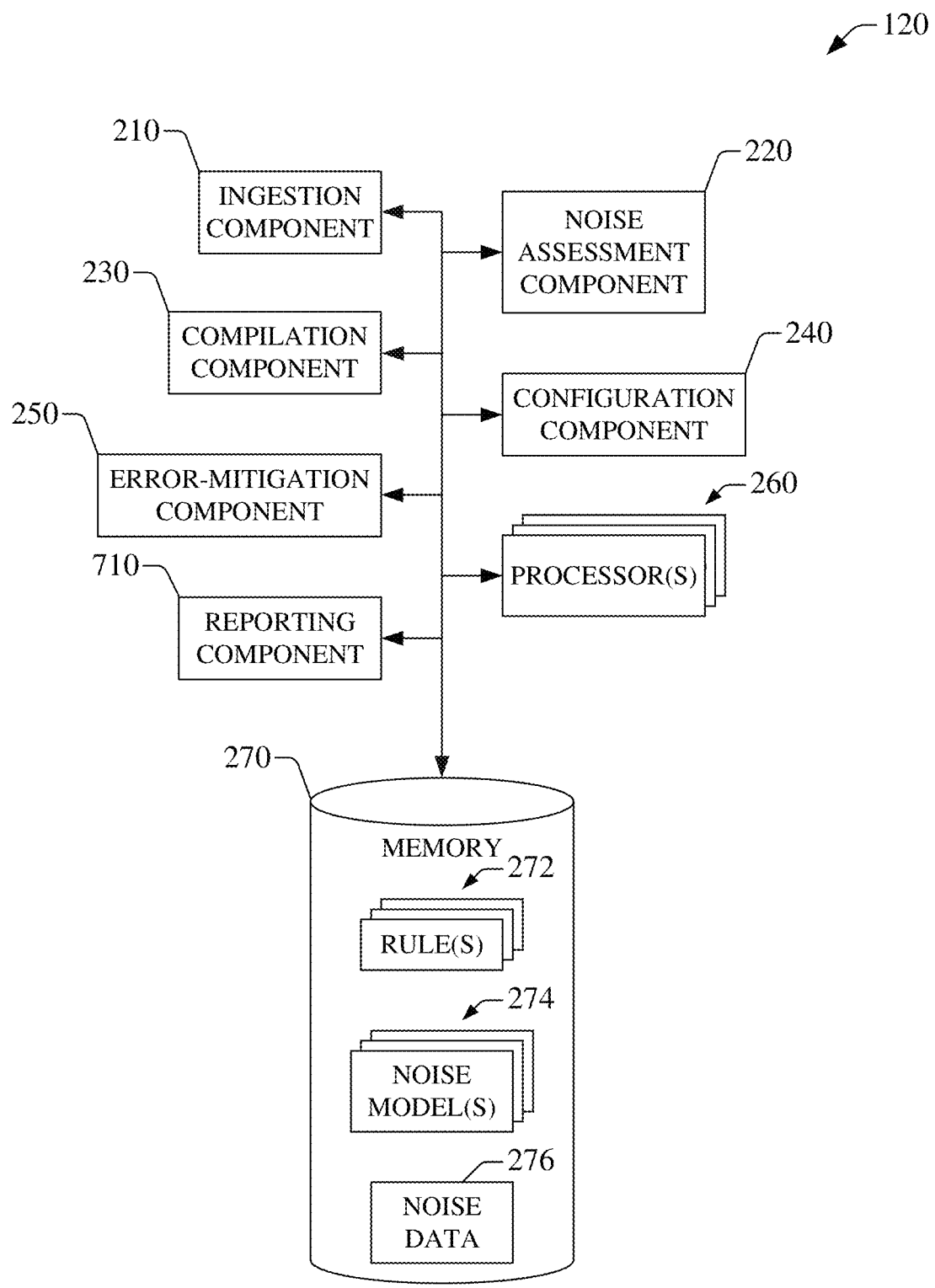
FIG. 7 illustrates a non-limiting example of a computing system for error mitigation in a quantum program, in accordance with one or more embodiments described herein.

In some embodiments, as is illustrated in FIG. 6, the compiler system 120 can supply sequence data 610 identifying the one or several noise-mitigation sequences 128 to the end-user device 110. To that end, the compiler system 120 can send the sequence data 610 to an I/O subsystem (not depicted in FIG. 6) operatively coupled to the compiler system 120. The I/O subsystem can send the sequence data 610 with a computation result 620 from the execution of the quantum program 112. In some cases, as is shown in FIG. 6, the sequence data 610 can be added (e.g., appended) to a file containing the computation result 620. In other cases, the sequence data 610 can be sent to the user device 110 separately from the file containing the computation result 620. In addition, or in other embodiments, the compiler system 120 can send data 630 defining a noise model used to determine noise conditions of one or several ones of the quantum devices 140. In one embodiment, as is illustrated in FIG. 7, the compiler system 120 can include a reporting component 710 that can send the sequence data 610 or the data 630, or both, to the I/O subsystem (note depicted in FIG. 7).

Figure 8:
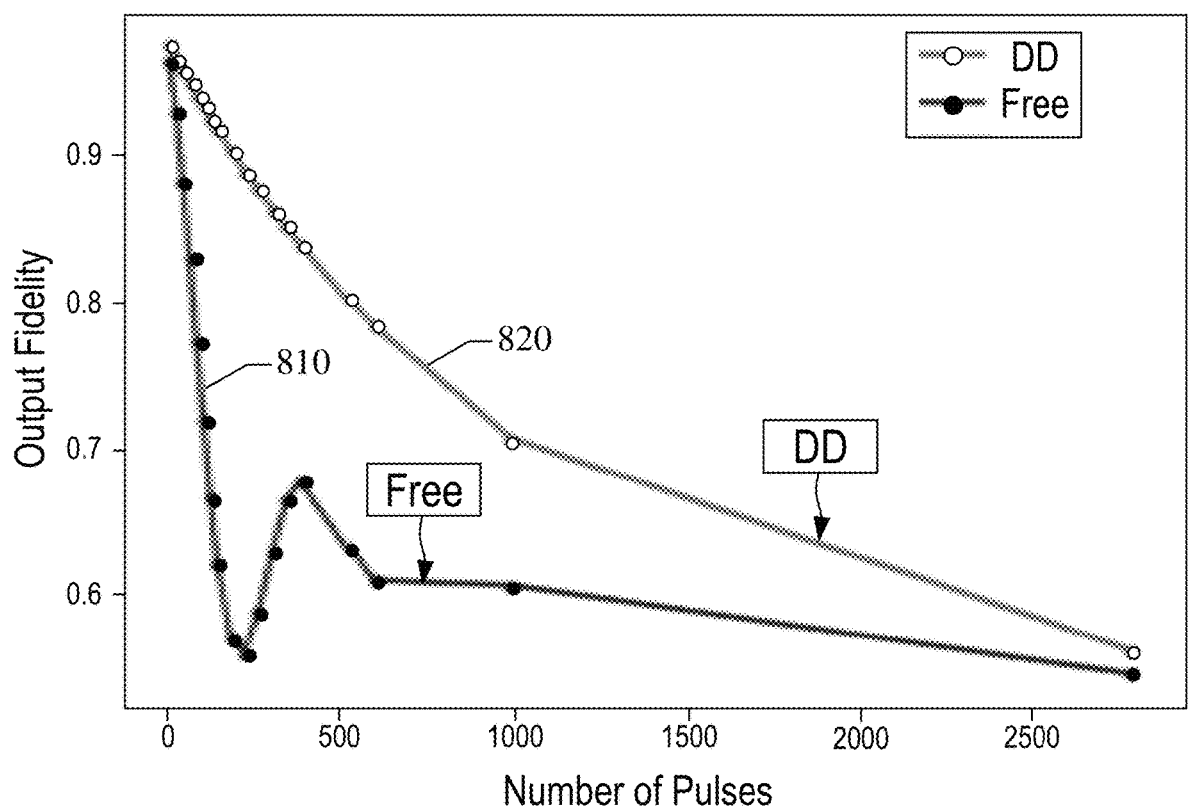
FIG. 8 illustrates a non-limiting example of observed output fidelity as a function of number of pulses in noisy quantum hardware, in accordance with one or more embodiments described herein.

As mentioned, embodiments of this disclosure can permit executing quantum circuits including lengthier sequences of operations on noisy quantum hardware. FIG. 8 illustrates a non-limiting example of observed output fidelity as a function of number of pulses, in accordance with one or more embodiments described herein. A quantum program (such as quantum program 112) having a quantum circuit including a single qubit device is executed in two scenarios. In one scenario (denoted by "Free" in FIG. 8), sequences of error-mitigating operations are absent during the execution of the quantum circuit. Thus, the single qubit device is initialized into a random state by implementing a state preparation operation. Subsequently, the single qubit device is allowed to evolve freely within its environment during a defined time interval. The defined time interval is represented as a delay in the quantum circuit. An inverse state-preparation operation is implemented after the defined time interval elapses, followed by measurement. Because error-mitigating operations are absent, the number of pulses in the Free scenario represents the defined time interval. Trace 810 presents observed output fidelity in such a scenario.

In another scenario (denoted by "DD" in FIG. 8), sequences of error-mitigating operations are inserted into the quantum circuit, and thus, applied during execution of the quantum circuit. Again, the single qubit device is initialized into a random state by implementing the state preparation operation. Then, a particular number of sequences of error-mitigating operations are implemented. For instance, a number of XY4 sequences can be implemented. After the implementation of the particular number of sequences of error-mitigating operations, the inverse state-preparation operation is implemented followed by measurement. Trace 820 presents observed output fidelity in such a DD scenario. The number of pulses in this scenario represents the particular number of such sequences. The delay in the Free scenario can be configured to coincide with the duration of a particular number of pulses in the DD scenario in order to compare output fidelity in both scenarios. Without intending to be bound by theory and/or interpretation, the application of the sequences of error-mitigating operations yields greater output fidelity.

Figure 9:
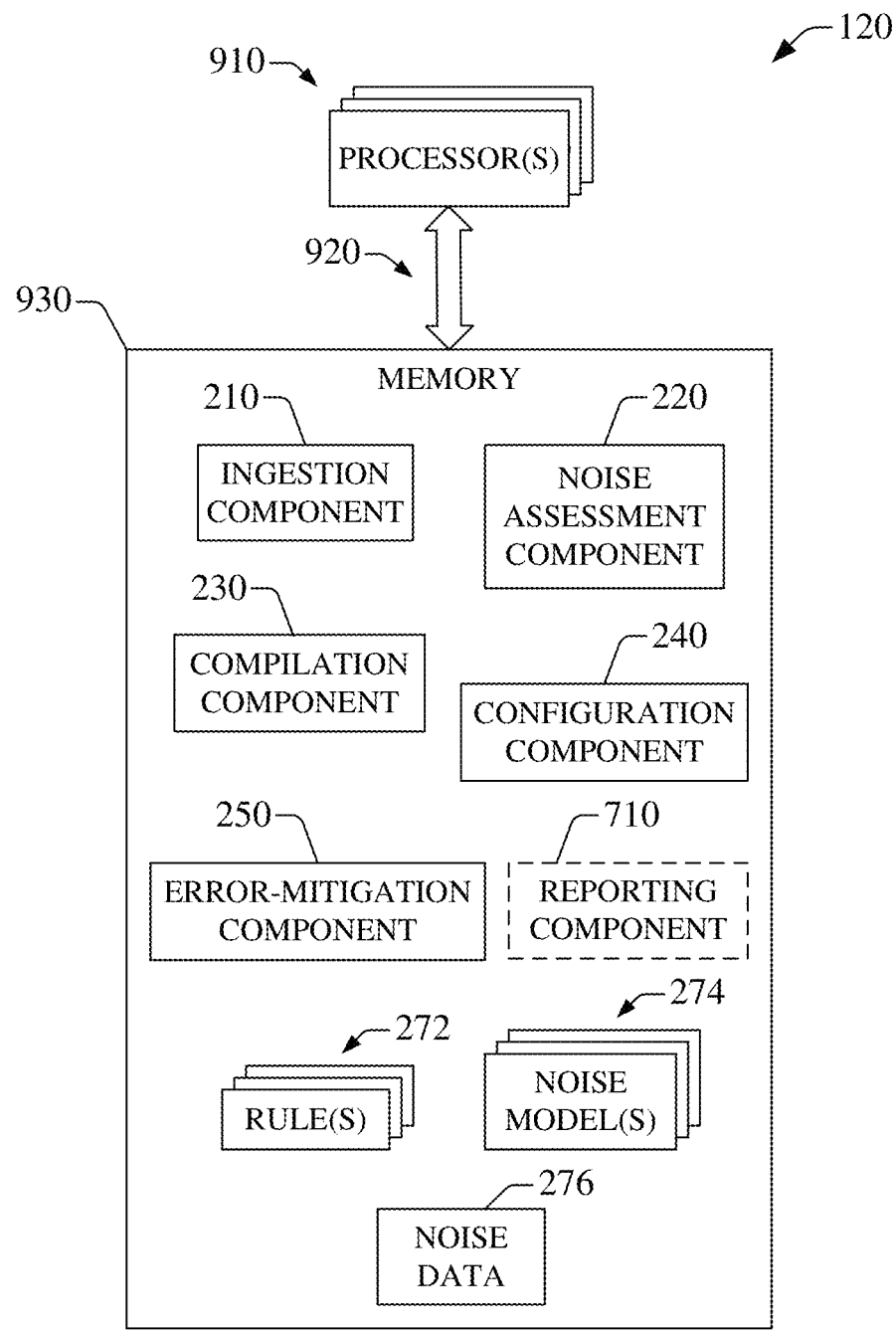
FIG. 9 illustrates a non-limiting example of a computing system for error mitigation in a quantum program, in accordance with one or more embodiments described herein.

FIG. 9 is a block diagram of a non-limiting example of the compiler system 120 for error mitigation in a quantum program, in accordance with one or more embodiments of these disclosure. As is illustrated in FIG. 9, the compiler system 120 can include one or several processors 910 and one or several memory devices 930 (referred to as memory 930). In some embodiments, the processor(s) 610 can be arranged in a single computing apparatus (a blade server device or another type of server device, for example). In other embodiments, the processor(s) 610 can be distributed across two or more computing apparatuses (e.g., multiple blade server devices or other types of server devices).

The processor(s) 910 can be operatively coupled to the memory 930 via one or several communication interfaces 920, for example. The communication interface(s) 920 can be suitable for the particular arrangement (localized or distributed) of the processor(s) 910. In some embodiments, the communication interface(s) 920 can include one or many bus architectures, such an Ethernet-based industrial bus, a controller area network (CAN) bus, a Modbus, other types of fieldbus architectures, or the like. In addition, or in other embodiments, the communication interface(s) can include a wireless network and/or a wireline network having respective footprints.

The memory 930 can retain or otherwise store therein machine-accessible components (e.g., computer-readable and/or computer-executable components) and data in accordance with this disclosure. As such, in some embodiments, machine-accessible instructions (e.g., computer-readable and/or computer-executable instructions) embody or otherwise constitute each one of the machine-accessible components within the memory 930. The machine-accessible instructions can be encoded in the memory 930 and can be arranged to form each one of the machine-accessible components. The machine-accessible instructions can be built (e.g., linked and compiled) and retained in computer-executable form within the memory 930 or in one or several other machine-accessible non-transitory storage media. Specifically, as is shown in FIG. 9, in some embodiments, the machine-accessible components include the ingestion component 210, the noise assessment component 220, the compilation component 230, the configuration component 240. The compiler system 120 can optionally include the reporting component 710. The memory 930 also can include data (not depicted in FIG. 9) that permits various of the functionalities described herein. In some embodiments, the compilation component 230 can include the configuration component 240. As is illustrated in FIG. 9, the memory 930 can retain the rule(s) 272, the noise model(s) 274, and the noise data 276.

The machine-accessible components, individually or in a particular combination, can be accessed and executed by at least one of the processor(s) 910. In response to execution, each one of the machine-accessible components can provide the functionality described herein in connection with error mitigation in a quantum program. Accordingly, execution of the computer-accessible components retained in the memory 930 can cause the compiler system 120 to operate in accordance with aspects described herein. More concretely, at least one of the processor(s) 910 can execute the machine-accessible components to cause the compiler system 120 to identify a noise condition of a quantum device (e.g., a qubit device or a qudit device), and modify the quantum program by inserting a sequence of error-mitigating operations into the quantum program in response to the noise condition satisfying a noise-mitigation rule during compilation of the quantum program, in accordance with aspects of this disclosure.

Although not illustrated in FIG. 9, the compiler system 120 also can include other types of computing resources that can permit or otherwise facilitate the execution of the machine-accessible components retained in the memory 930. Those computing resources can include, for example, central processing units (CPUs), graphics processing units (GPUs), tensor processing units (TPUs), memory, disk space, incoming bandwidth, and/or outgoing bandwidth, interface(s) (such as I/O interfaces); controller devices(s); power supplies; and the like. For instance, the memory 930 also can include programming interface(s) (such as APIs); an operating system; software for configuration and or control of a virtualized environment; firmware; and similar.

Figure 10:
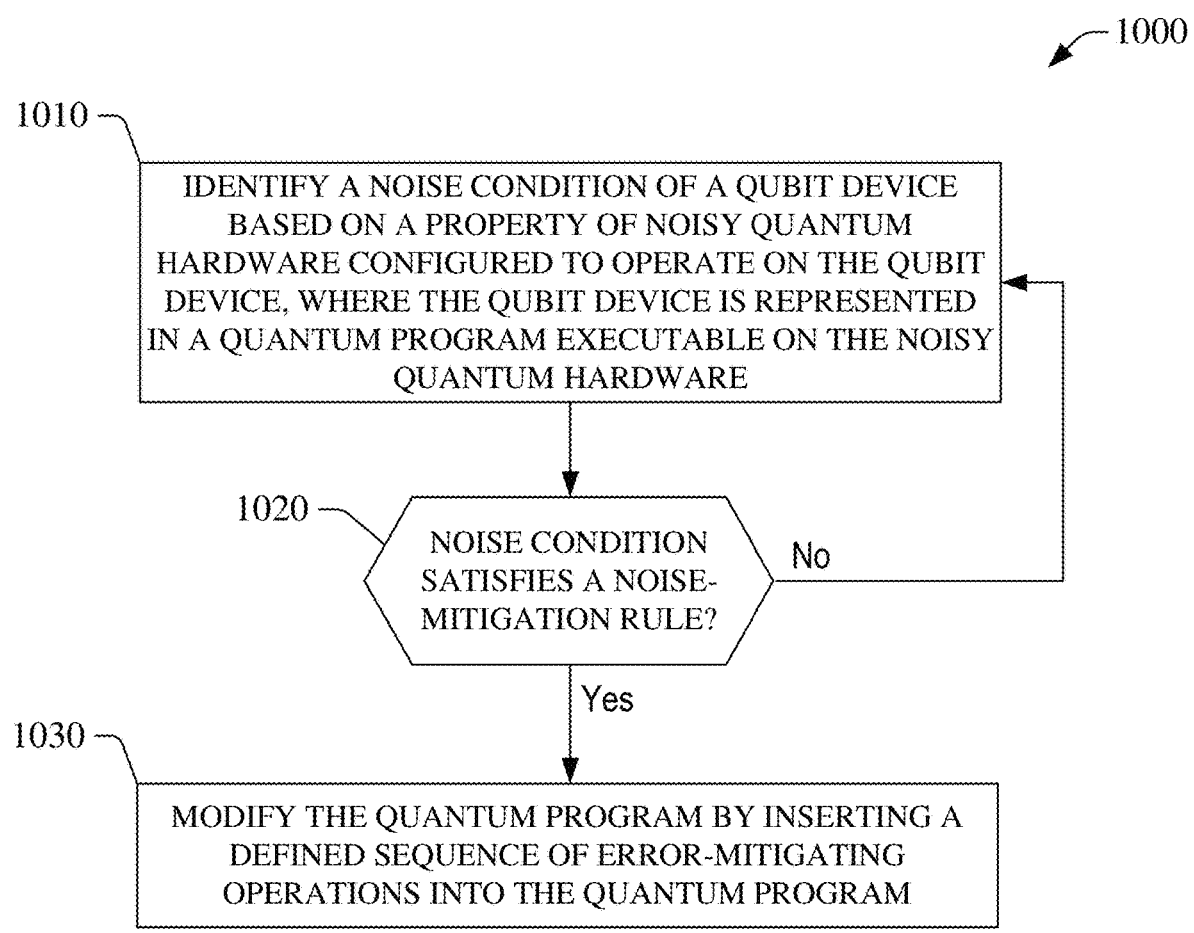
FIG. 10 illustrates a non-limiting example of a computer-implemented method for error mitigation in quantum programs, in accordance with one or more embodiments described herein.

FIG. 10 is a flowchart of a non-limiting example of a computer-implemented method 1000 for error mitigation in quantum programs, in accordance with one or more embodiments of this disclosure. While described with reference to a qubit device, the example method 1000 also can be implemented for other types of quantum devices, such as qudit devices. A computing system can implement, at least partially, the computer-implemented method 1000. Implementing the computer-implemented method 1000 can include compiling or executing, or both, one or several of the blocks included in the computer-implemented method 1000, for example. The computing system can include, and/or can be operatively coupled to, one or several processors, one or several memory devices, other types of computing resources (such as communication interface(s)), a combination thereof, or other similar resources. In some embodiments, the computing system can be embodied in, or can constitute, the compiler system 120 in accordance with the various embodiments disclosed herein.

At block 1010, the computing system can identify a noise condition of a qubit device based on a noise property of noisy quantum hardware configured to operate on the qubit device. Such a noise condition can be identified by the noise assessment component 220 (FIG. 2), for example. As such, in some embodiments, the computing system can execute the noise assessment component 220. As mentioned, the qubit device is represented in a quantum program for execution on the noisy quantum hardware. Identifying such a noise condition can include, for example, continually receiving data indicating a contemporaneous characteristic of noise affecting the qubit device. In other cases, rather than receiving that data continually, the computing system can receive the data periodically, at a defined rate. Such data can be received by the computing system via the ingestion component 210 (FIG. 2), for example. As such, in some embodiments, the computing system can execute the ingestions component 210.

At block 1020, the computing system can determine (via the noise assessment component 220 (FIG. 2), for example) that the noise condition satisfies an error-mitigation rule defined according to at least one of heuristics or an analytic formalism. The error-mitigation rule can be retained in the rules 272 (FIG. 2). A negative determination can cause the flow of the example method 1000 to proceed to block 1010. A negative determination can cause the flow of the example method 1000 to proceed to block 1030.

At block 1030, the computing system can modify the quantum program by inserting a defined sequence of error-mitigating operations into the quantum program. The defined sequence of error-mitigation operations can be based, at least in part, on the noise condition. The quantum program can be modified in such a fashion by the compilation component 230 (FIG. 2), for example. As such, in some embodiments, the computing system can execute the compilation component 220 (FIG. 2). The defined sequence of error-mitigating operations can include a non-computational operation, for example. Thus, in some embodiments, inserting the defined sequence of error-mitigating operations can include determining a DD sequence of pulses based on the property of the noisy quantum hardware or a configuration of the quantum program, or both. After the DD sequence of pulses is determined, in some embodiments, inserting the sequence of error-mitigating corrections can include inserting a representation of the DD sequence of pulses into a program schedule included in the quantum program. In other cases, the representation of the DD sequence of pulses can be inserted into a quantum circuit included in the quantum program. The quantum circuit can be one of the group of quantum circuits 114 (FIG. 1A) within the quantum program 112.

Figure 11:
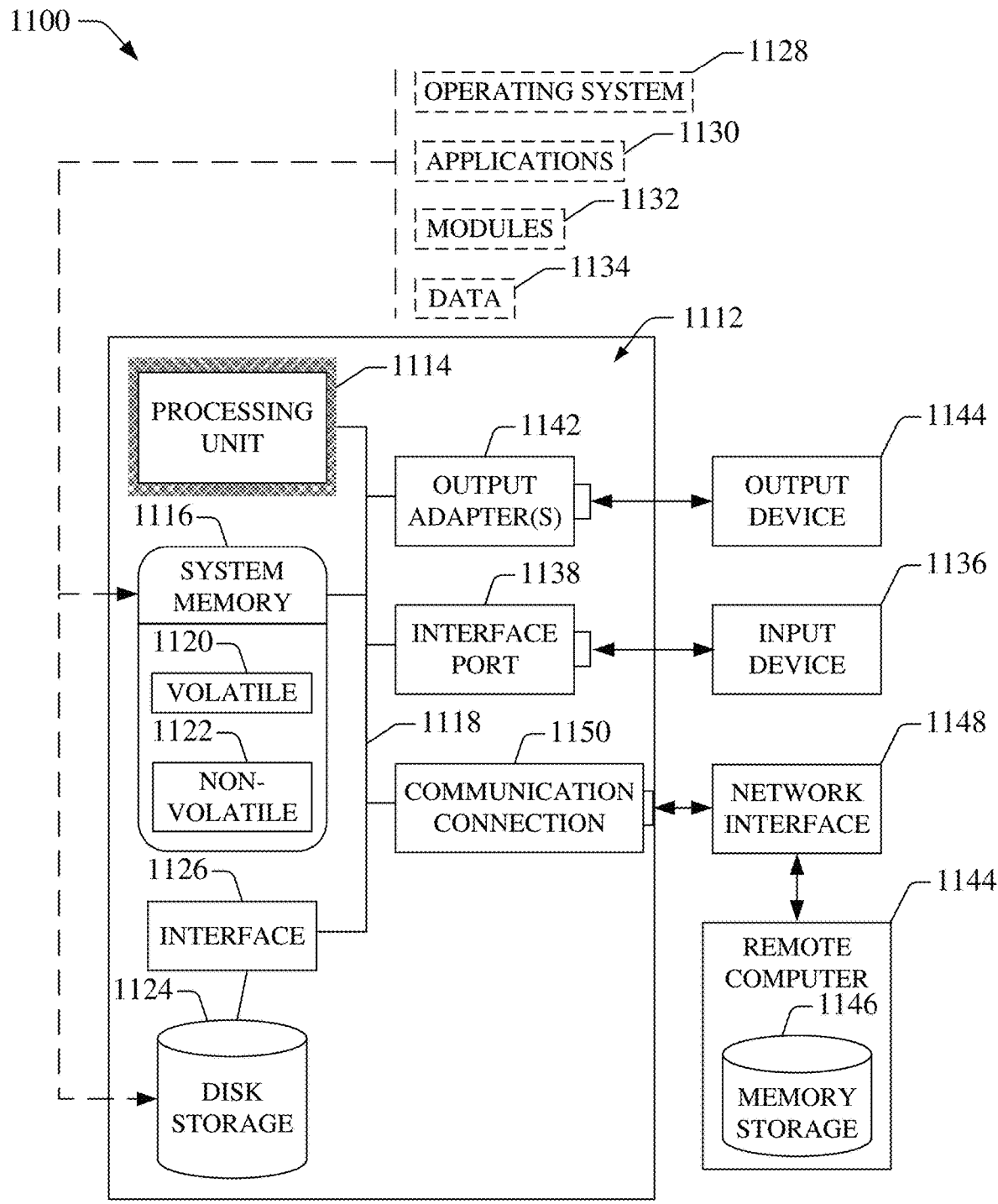
FIG. 11 is a block diagram of a non-limiting example of an operating environment in which one or more embodiments described herein can be implemented.

In order to provide a context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity. A suitable operating environment 1100 for implementing various aspects of this disclosure can include a computer 1112. The computer 1112 can also include a processing unit 1114, a system memory 1116, and a system bus 1118. The system bus 1118 can operably couple system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1116 can also include volatile memory 1120 and nonvolatile memory 1122. The basic input/output system (BIOS), containing the basic routines to transfer information between elements within the computer 1112, such as during start-up, can be stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface can be used, such as interface 1126. FIG. 11 also depicts software that can act as an intermediary between users and the basic computer resources described in the suitable operating environment 1100. Such software can also include, for example, an operating system 1128. Operating system 1128, which can be stored on disk storage 1124, acts to control and allocate resources of the computer 1112. System applications 1130 can take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through one or more input devices 1136. Input devices 1136 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1114 through the system bus 1118 via one or more interface ports 1138. The one or more Interface ports 1138 can include, for example, a serial port, a parallel port, a game port, and a universal serial bus (USB). One or more output devices 1140 can use some of the same type of ports as input device 1136. Thus, for example, a USB port can be used to provide input to computer 1112, and to output information from computer 1112 to an output device 1140. Output adapter 1142 can be provided to illustrate that there are some output devices 1140 like monitors, speakers, and printers, among other output devices 1140, which require special adapters. The output adapters 1142 can include, by way of illustration and not limitation, video and sound cards that provide a means of connection between the output device 1140 and the system bus 1118. It should be noted that other devices and/or systems of devices provide both input and output capabilities such as one or more remote computers 1144.

Computer 1112 can operate in a networked environment using logical connections to one or more remote computers, such as remote computer 1144. The remote computer 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer 1144. Remote computer 1144 can be logically connected to computer 1112 through a network interface 1148 and then physically connected via communication connection 1150. Further, operation can be distributed across multiple (local and remote) systems. Network interface 1148 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

Figure 12:
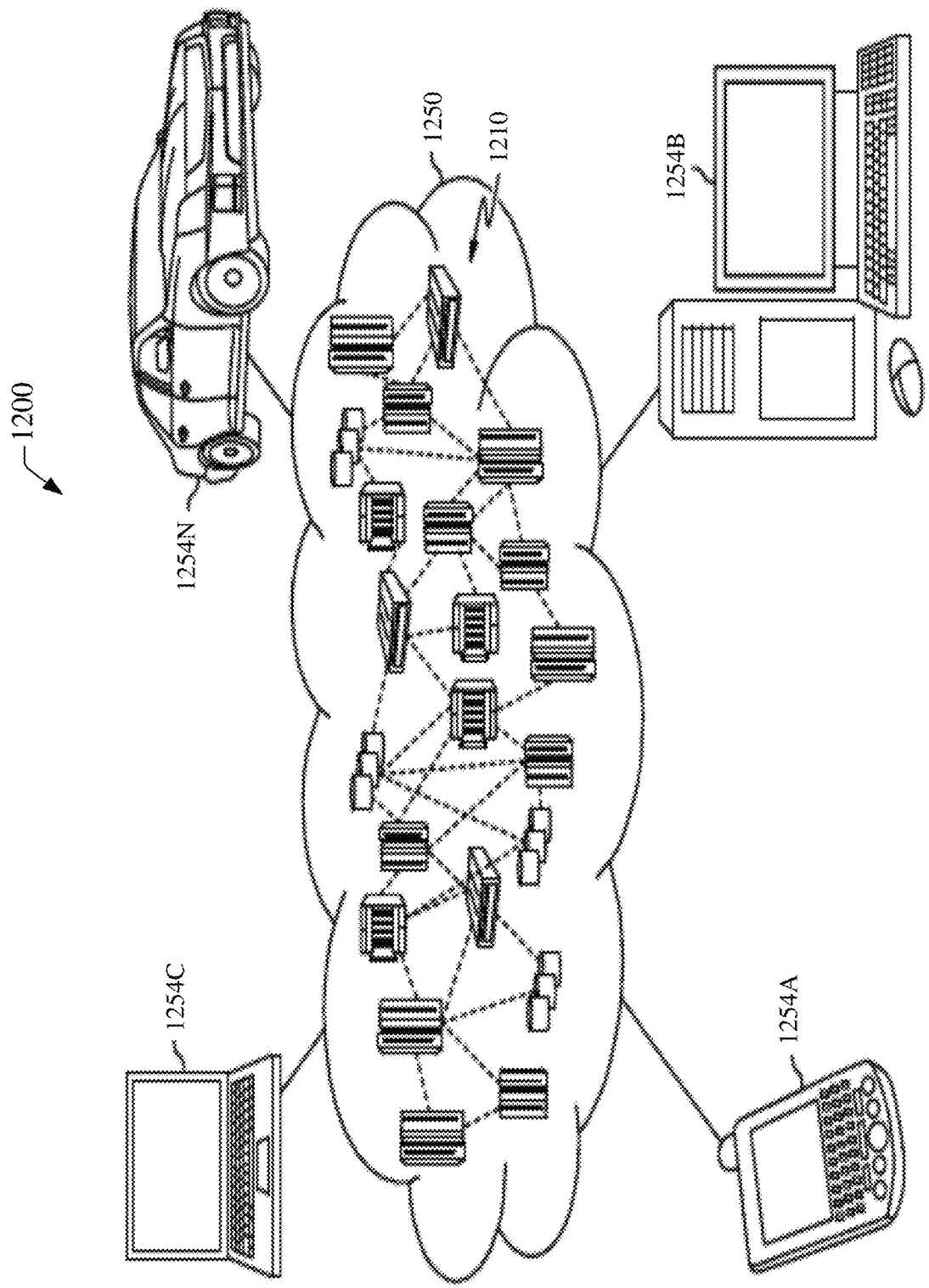
FIG. 12 is a block diagram of a non-limiting example of a cloud computing environment in accordance with one or more embodiments described herein.

In some embodiments, the compiler system 120 described herein can be associated with a cloud computing environment. For example, the compiler system 120 can be associated with cloud computing environment 1250 as is illustrated in FIG. 12 and/or one or more functional abstraction layers described herein with reference to FIG. 12 (e.g., hardware and software layer 1260, virtualization layer 1270, management layer 1280, and/or workloads layer 1290).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 12 an illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Although not illustrated in FIG. 12, cloud computing nodes 1210 can further comprise a quantum platform (e.g., quantum computer, quantum hardware, quantum software, and/or another quantum platform) with which local computing devices used by cloud consumers can communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
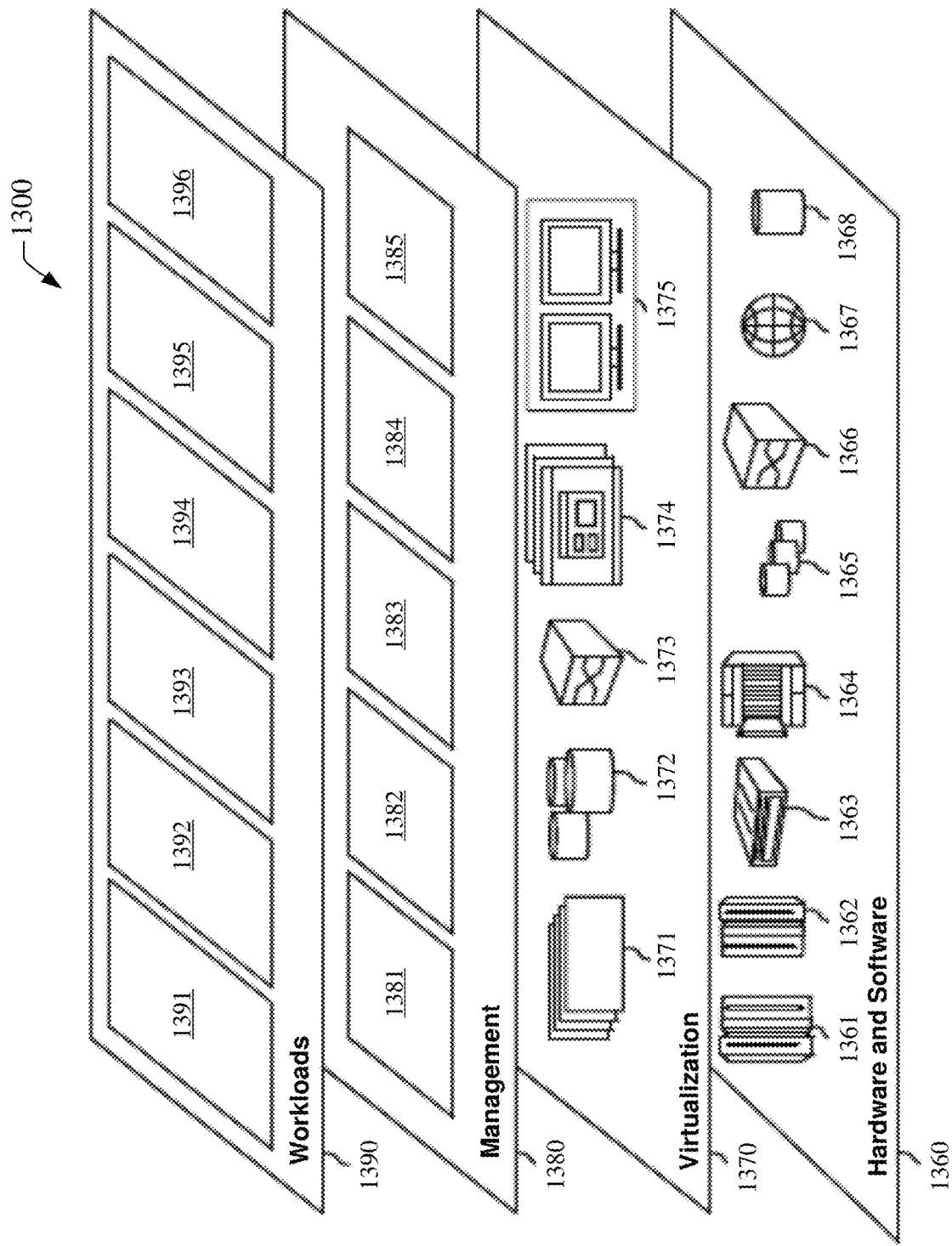
FIG. 13 is a block diagram of a non-limiting example of abstraction model layers in accordance with one or more embodiments described herein.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 include hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367, database software 1368, quantum platform routing software (not illustrated in FIG. 13), and/or quantum software (not illustrated in FIG. 13).

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Non-limiting examples of workloads and functions which may be provided from this layer include: mapping and navigation 1391; software development and lifecycle management 1392; virtual classroom education delivery 1393; data analytics processing 1394; transaction processing 1395; and vulnerability risk assessment software 1396.

Embodiments of the present invention may be a system, a method, an apparatus and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

In this disclosure, terms such as "store," "storage," "data store," data storage," "database," "repository," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer-executable components; and
   a processor that executes at least one of the computer-executable components that:
   identifies a noise condition of a qubit device based on a noise property of quantum hardware configured to operate on the qubit device, wherein the qubit device is represented in a quantum program executable on the quantum hardware;
   determines a defined sequence of error-mitigating operations to mitigate the noise condition, wherein the defined sequence of error-mitigating operations has a defined time duration;
   identifies a group of idle periods in the quantum program, wherein a first subgroup of the group of idle periods have respective time durations of at least the defined time duration, and wherein a second subgroup of the group of idle periods do not have respective time durations of at least the defined time duration;
   compiles the quantum program, wherein the compiling comprises inserting at least one repetition of the defined sequence of error-mitigating operations into respective idle periods of the first subgroup of the idle periods, and not inserting the defined sequence of error-mitigating operations into respective idle periods of the second subgroup of the idle periods; and
   executes the compiled quantum program on the quantum hardware.

2. The system of claim 1, wherein the at least one of the computer-executable components further:
   receives the quantum program from a user device operatively coupled to the system.

3. The system of claim 1, wherein the at least one of the computer-executable components further:
   continually receives, from a noise monitoring unit, data indicating a contemporaneous characteristic of noise affecting the qubit device.

4. The system of claim 3, wherein the at least one of the computer-executable components further:
   determines that the noise condition satisfies an error-mitigation rule defined according to at least one of heuristics or an analytic formalism.

5. The system of claim 1, wherein the defined sequence of error-mitigating operations comprises a non-computational sequence of operations that implements an identity operation, and wherein the at least one of the computer-executable components further:
   determines a dynamic decoupling (DD) sequence of pulses based on one or more of the noise property or a configuration of the quantum program.

6. The system of claim 5, wherein the at least one of the computer-executable components further:
   inserts a representation of the DD sequence of pulses into a program schedule included in the quantum program or a quantum circuit included in the quantum program.

7. The system of claim 5, wherein the at least one of the computer-executable components further:
   inserts a representation of the DD sequence of pulses into a quantum circuit included in the quantum program.

8. The system of claim 5, wherein the at least one of the computer-executable components further:
   applies the DD sequence of pulses to one or more qubit devices via one or more DD gates, the one or more qubit devices represented by the quantum circuit.

9. The system of claim 1, wherein the quantum hardware comprises a cloud-based quantum computer.

10. A computer-implemented method, comprising:
    identifying, by a system operatively coupled to a processor, a noise condition of a qubit device based on a noise property of quantum hardware configured to operate on the qubit device, wherein the qubit device is represented in a quantum program executable on the quantum hardware;
    determining, by the system, a defined sequence of error-mitigating operations to mitigate the noise condition, wherein the defined sequence of error-mitigating operations has a defined time duration;
    identifying, by the system, a group of idle periods in the quantum program, wherein a first subgroup of the group of idle periods have respective time durations of at least the defined time duration, and wherein a second subgroup of the group of idle periods do not have respective time durations of at least the defined time duration;
    compiling, by the system, the quantum program, wherein the compiling comprises inserting at least one repetition of the defined sequence of error-mitigating operations into respective idle periods of the first subgroup of the idle periods, and not inserting the defined sequence of error-mitigating operations into respective idle periods of the second subgroup of the idle periods; and executing, by the system, the compiled quantum program on the quantum hardware.

11. The computer-implemented method of claim 10, wherein the identifying comprises continually receiving data indicating a contemporaneous characteristic of noise affecting the qubit device.

12. The computer-implemented method of claim 11, wherein the identifying further comprises determining, using the data, that the noise condition satisfies an error-mitigation rule defined according to at least one of heuristics or an analytic formalism.

13. The computer-implemented method of claim 10, wherein the defined sequence of error-mitigating operations comprises a non-computational sequence of operations that implements an identity operation, and wherein the inserting comprises determining a dynamic decoupling (DD) sequence of pulses based on one or more of the noise property of the quantum hardware or a configuration of the quantum program.

14. The computer-implemented method of claim 13, wherein the inserting further comprises inserting a representation of the DD sequence of pulses into at least one of a program schedule included in the quantum program or a quantum circuit included in the quantum program.

15. A computer program product for noise mitigation in quantum programs, the computer program product comprising a computer-readable storage medium having program instructions embodied therewith, the program instructions executable by a processor to cause the processor to:
identify, by the processor, a noise condition of a qubit device based on a property of quantum hardware configured to operate on the qubit device, wherein the qubit device is represented in a quantum program executable on the quantum hardware;
determine, by the processor, a defined sequence of error-mitigating operations to mitigate the noise condition, wherein the defined sequence of error-mitigating operations has a defined time duration;
identify, by the processor, a group of idle periods in the quantum program, wherein a first subgroup of the group of idle periods have respective time durations of at least the defined time duration, and wherein a second subgroup of the group of idle periods do not have respective time durations of at least the defined time duration;
compile, by the processor, the quantum program, wherein the compiling comprises inserting at least one repetition of the defined sequence of error-mitigating operations into respective idle periods of the first subgroup of the idle periods, and not inserting the defined sequence of error-mitigating operations into respective idle periods of the second subgroup of the idle periods; and
execute, by the processor, the compiled quantum program on the quantum hardware.

16. The computer program product of claim 15, wherein identifying the noise condition comprises continually receiving data indicating a contemporaneous characteristic of noise affecting the qubit device.

17. The computer program product of claim 15, wherein the program instructions are further executable by the processor to cause the processor to determine that the noise condition satisfies an error-mitigation rule defined according to at least one of heuristics or an analytic formalism.

18. The computer program product of claim 15, wherein the program instructions are further executable by the processor to cause the processor to determine a dynamic decoupling (DD) sequence of pulses based on one or more of the noise property of the quantum hardware or a configuration of the quantum program.

19. The computer program product of claim 18, wherein the program instructions are further executable by the processor to cause the processor to insert a representation of the DD sequence of pulses into at least one of a program schedule included in the quantum program or a quantum circuit included in the quantum program.

20. The computer program product of claim 19, wherein the program instructions are further executable by the processor to cause the processor to apply the DD sequence of pulses to one or more qubit devices via one or more DD gates, the one or more qubit devices represented by the quantum circuit.

* * * * *